US012781971B2

(12) United States Patent
Peter

(10) Patent No.: US 12,781,971 B2
(45) Date of Patent: Nov. 3, 2026

(54) OPERATING MECHANISM FOR A SLIDING SUPPORT OF A COOKING APPLIANCE HAVING A COOKING CHAMBER, AND COOKING APPLIANCE

(71) Applicant: Miele & Cie. KG, Guetersloh (DE)

(72) Inventor: Sarah Peter, Dorsten (DE)

(73) Assignee: MIELE & CIE. KG, Guetersloh (DE)

( * ) Notice: Subject to any disclaimer, the term of this patent is extended or adjusted under 35 U.S.C. 154(b) by 450 days.

(21) Appl. No.: 18/500,190

(22) Filed: Nov. 2, 2023

(65) Prior Publication Data

US 2024/0151406 A1 May 9, 2024

(30) Foreign Application Priority Data

Nov. 9, 2022 (DE) ..................... 10 2022 129 619.9

(51) Int. Cl.
*F24C 15/16* (2006.01)
*E05F 15/611* (2015.01)

(52) U.S. Cl.
CPC .......... *F24C 15/162* (2013.01); *E05F 15/611* (2015.01); *E05Y 2600/12* (2013.01); *E05Y 2900/308* (2013.01)

(58) Field of Classification Search
CPC .. F24C 15/162; E05F 15/611; E05Y 2600/12; E05Y 2900/308
USPC ........................................................ 126/19 R
See application file for complete search history.

(56) References Cited

U.S. PATENT DOCUMENTS 3,485,231 A 12/1969 Guibert
5,341,542 A * 8/1994 Hannan ................. E05F 1/1276 16/375
5,467,559 A * 11/1995 Owens .................. E06B 7/2316 160/40
8,250,707 B2 * 8/2012 Donoho ................ E05F 1/1276 16/297

(Continued)

FOREIGN PATENT DOCUMENTS

EP 0521251 A1 1/1993
EP 1248046 A2 10/2002

(Continued)

*Primary Examiner* — Avinash A Savani
(74) *Attorney, Agent, or Firm* — LEYDIG, VOIT & MAYER, LTD.

(57) ABSTRACT

An operating mechanism for a sliding support of a cooking appliance having a cooking chamber which is closable by a cooking chamber door, the operating mechanism including: an overload protection device configured to protect the operating mechanism from being damaged by improper use of the cooking chamber door and/or of the sliding support, the overload protection device having a slip coupling having a first contact surface and a second contact surface which, in non-overload conditions, is force-transmittingly connected to the first contact surface, each contact surface including at least one of a friction surface and an interlocking engagement surface. The operating mechanism automatically operates the sliding support. A contact force between the first contact surface and the second contact surface is manually adjustable using an adjusting element of the overload protection device without any need to remove the operating mechanism from a remainder of the cooking appliance.

15 Claims, 4 Drawing Sheets

(56) References Cited

U.S. PATENT DOCUMENTS

| | | | | |
|---|---|---|---|---|
| 8,308,250 | B2 * | 11/2012 | Koehler | A47B 96/16 126/339 |
| 2007/0261199 | A1 * | 11/2007 | Petri | F24C 15/16 126/340 |
| 2020/0386414 | A1 * | 12/2020 | Ryu | F24C 15/162 |

FOREIGN PATENT DOCUMENTS

| | | | | |
|---|---|---|---|---|
| EP | 2716978 | A2 | 4/2014 | |
| FR | 3084927 | A1 * | 2/2020 | F24C 15/168 |

* cited by examiner

OPERATING MECHANISM FOR A SLIDING SUPPORT OF A COOKING APPLIANCE HAVING A COOKING CHAMBER, AND COOKING APPLIANCE

CROSS-REFERENCE TO PRIOR APPLICATION

Priority is claimed to German Patent Application No. DE 10 2022 129 619.9, filed on Nov. 9, 2022, the entire disclosure of which is hereby incorporated by reference herein.

FIELD

The invention relates to an operating mechanism for a sliding support of a cooking appliance having a cooking chamber and to a cooking appliance.

BACKGROUND

Cooking appliances having a cooking chamber have been previously described in various embodiments in the art and include a housing, a cooking chamber disposed in the housing and bounded by cooking chamber walls, a cooking chamber door movable back and forth between a closed position and an open position for closing a cooking chamber opening of the cooking chamber in the closed position of the cooking chamber door and for access to the cooking chamber via the cooking chamber opening in the open position of the cooking chamber door, and a sliding support mounted on at least one cooking chamber wall of the cooking chamber walls and adapted for supporting a separate accessory of the cooking appliance for receiving food to be cooked, the sliding support being manually movable back and forth between a retracted position, in which the sliding support is fully received in the cooking chamber, and an extended position, in which the sliding support is at least partially extended out of the cooking chamber. Furthermore, other embodiments of such cooking appliances are known where the cooking appliance has an operating mechanism for automatically operating the sliding support. This significantly increases the ease of use for a user of the inventive cooking appliance. Furthermore, this significantly reduces the risk of injury to the user of the cooking appliance according to the invention, since, unlike with manual operation of the sliding support, the user, for example, does not accidentally come into contact with hot surfaces of the cooking appliance.

SUMMARY

In an embodiment, the present invention provides an operating mechanism for a sliding support of a cooking appliance having a cooking chamber which is closable by a cooking chamber door, the operating mechanism being configured to automatically operate the sliding support, the operating mechanism comprising: an overload protection device configured to protect the operating mechanism from being damaged by improper use of the cooking chamber door and/or of the sliding support, the overload protection device comprising a slip coupling having a first contact surface and a second contact surface which, in non-overload conditions, is force-transmittingly connected to the first contact surface, each contact surface comprising at least one of a friction surface and/or an interlocking engagement surface, wherein the overload protection device is configured such that a contact force between the first contact surface and the second contact surface is manually adjustable using an adjusting element of the overload protection device without any need to remove the operating mechanism from a remainder of the cooking appliance.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
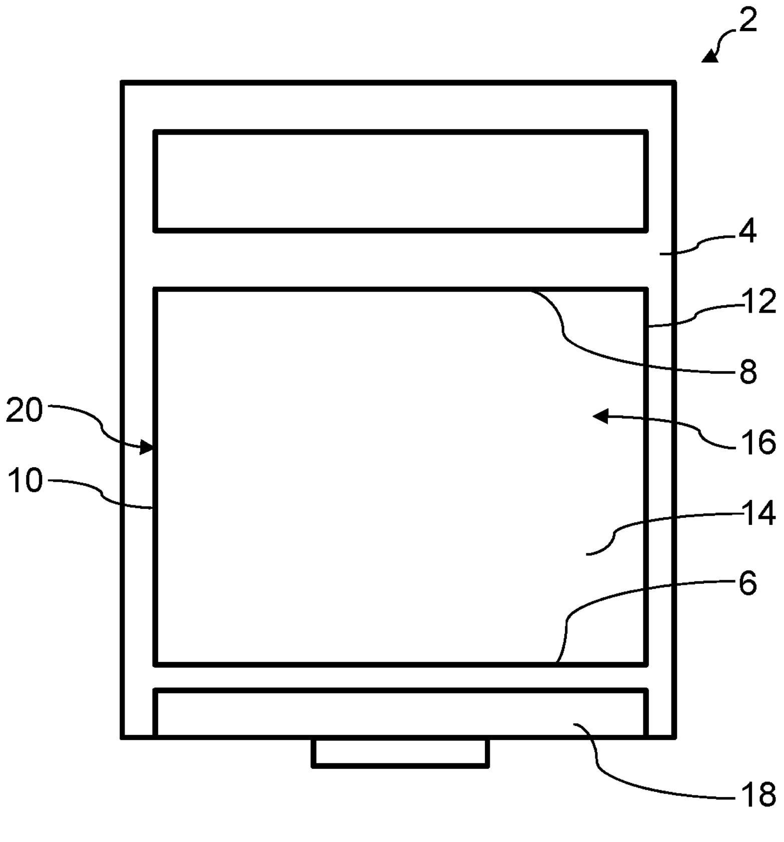
FIG. 1 is a partial front view of an embodiment of the inventive cooking appliance having the inventive operating mechanism, showing the cooking chamber door in its open position.

In an embodiment, the present invention provides an operating mechanism for a sliding support of a cooking appliance and a cooking appliance having a sliding support.

In an embodiment, the present invention provides an operating mechanism for a sliding support of a cooking appliance, including an overload protection device to protect the operating mechanism from being damaged by improper use of the cooking chamber door and/or of the sliding support, the overload protection device being designed as a slip coupling having a first contact surface as well as a second contact surface which, in non-overload conditions, is force-transmittingly connected to the first contact surface, and the two aforementioned contact surfaces each being configured as a friction surface and/or as an interlocking engagement surface, and the overload protection device being configured such that a contact force between the first contact surface and the second contact surface can be manually adjusted using an adjusting element of the overload protection device without any need to remove the operating mechanism from a remainder of the cooking appliance.

An advantage provided by the invention is that an operating mechanism for a sliding support of a cooking appliance and a cooking appliance having a sliding support are improved. The overload protection device according to the invention effectively protects the operating mechanism from being damaged in the event of improper use of the cooking chamber door and/or of the sliding support. Such an event may occur, for example, if a food item of excessive weight has been placed on the separate accessory supported by the sliding support, if the cooking chamber door is moved too quickly, if the sliding support is incorrectly manually moved, or if a separate accessory, such as the separate accessory supported by the sliding support, is not properly positioned. Furthermore, the overload protection device allows the individual components of the inventive cooking appliance that are relevant for the automatic movement of the sliding support to be designed and manufactured with less material. Also, the aforementioned components can be manufactured with greater tolerances and thus more cost-effectively. Therefore, the above-mentioned adjustment of the overload protection device simplifies assembly during the manufacture of the inventive cooking appliance equipped with the inventive operating mechanism. This is because the capability of adjustment makes it easy to compensate for component and assembly tolerances, for example. In addition, the inventive design of the overload protection device of the operating mechanism allows the overload protection device to be adjusted on site and, thus, after installation and initial operation at the end user's location. Such adjustment may be necessary, for example, when, due to wear and tear of the material, the contact force acting between the first and second contact surfaces falls below a lower limit for the proper functioning of the overload protection device. The term "drive rod" is intended herein to have a wide meaning and to include also rail-like or plate-like variants, for example.

The operating mechanism according to the invention and the cooking appliance according to the invention can, in principle, be freely selected within wide suitable limits in terms of type, function, material, and dimensions. For example, the inventive cooking appliance may be a baking oven or another cooking appliance having a cooking chamber. Here, reference is made, by way of example, only to steam cookers, microwave appliances, or combination cooking appliances; i.e., cooking appliances having different types of heating. Accordingly, the design of the separate accessory of the cooking appliance, which is supported on the sliding support, can be freely selected within wide suitable limits. For example, the separate accessory may be a baking sheet or a rack. Furthermore, the cooking appliance according to the invention may be a household appliance or a cooking appliance for professional use. The sliding support may also be configured as a so-called full-extension sliding support which, when in the extended position, is completely extended out of the cooking chamber of the cooking appliance. In this case, access to the sliding support, to a separate accessory placed on the sliding support, or to the food is further simplified. If the inventive cooking appliance has a plurality of rack levels, the inventive sliding support may, in principle, be positioned at any of the rack levels. In addition, the inventive cooking appliance is suitable for and can be advantageously used with all conceivable sizes of cooking appliances having a cooking chamber. It is particularly advantageous if the operating mechanism is configured such that the sliding support is automatically moved by the operating mechanism between its retracted position and its extended position depending on the movement of the cooking chamber door between its closed position and its open position and/or between its extended position and its retracted position depending on the movement of the cooking chamber door between its open position and its closed position. This is because this ensures that during the automatic movement of the sliding support and the automatic or manual movement of the cooking chamber door, a collision between the sliding support and the cooking chamber door is effectively prevented.

An advantageous embodiment of the operating mechanism according to the invention provides that the overload protection device be designed such that the aforementioned adjustment can be done simply by manipulating a single adjusting element of the overload protection device. In this way, the aforementioned adjustment of the overload protection device is significantly simplified.

Another advantageous embodiment of the operating mechanism according to the invention provides that the overload protection device be essentially disposed in an overload protector housing and mounted on the overload protector housing, the overload protector housing being releasably or permanently attachable to a housing of the cooking appliance. In this way, firstly, the overload protection device is effectively protected against environmental influences that are detrimental to the functioning of the overload protection device. Secondly, the overload protection device can essentially be handled as a unit, which further simplifies the manufacture of the inventive operating mechanism and of the cooking appliance equipped therewith.

A further advantageous embodiment of the operating mechanism according to the invention provides that the operating mechanism have a drive fork capable of being force-transmittingly coupled to a hinge of the cooking chamber door and having the first contact surface, as well as a toothed disk directly or indirectly force-transmittingly coupled to the sliding support and having the second contact surface, the toothed disk and the drive fork being torque-transmittingly mounted on a common bearing shaft of the operating mechanism and capable of being biased against each other by means of a spring of the overload protection device and the adjusting element, preferably, that a friction and/or interlock liner having the first contact surface or the second contact surface be non-rotatably disposed on the drive fork or on the toothed disk. In this way, the operating mechanism according to the invention can be implemented in a particularly simple and robust manner in terms of design and production. In addition, in the present embodiment of the operating mechanism according to the invention, an electric motor and its signal-transmitting and power-transmitting connection with a controller of the cooking appliance can be dispensed with. The inventive operating mechanism for automatically operating the sliding support in accordance with this embodiment can be implemented with purely mechanical means. The preferred variant of this embodiment also has the further advantage that, for example, a coefficient of friction between the first and second contact surfaces is easily settable by means of the friction and/or interlock liner. In addition, the friction and/or interlock liner makes it is possible, for example, to adjust the aforementioned coefficient of friction independently of the drive fork or of the toothed disk, which provides greater freedom in the selection of the material for the aforementioned component of the operating mechanism.

An advantageous refinement of the aforementioned embodiment of the operating mechanism according to the invention provides that the bearing shaft be supported with a first end of the bearing shaft and a first bearing element of the operating mechanism at a side of the overload protector housing facing the cooking chamber of the cooking appliance and with a second end of the bearing shaft and a second bearing element of the operating mechanism at a side of the overload protector housing opposite the aforementioned side, the first and second bearing elements each being configured to reduce friction as compared to if the bearing shaft were supported directly on the overload protector housing, preferably, that the second bearing element be configured to interlockingly connect the drive fork to the bearing shaft, particularly preferably, that the bearing shaft have a contour that interlockingly engages with the second bearing element and with the toothed disk. In this way, the friction between the bearing shaft and the overload protector housing is significantly reduced. In addition, the preferred and, in particular, the particularly preferred variant of this embodiment further simplify the construction and assembly and allow for savings in terms of components and materials.

An advantageous variant of the last-mentioned embodiment of the operating mechanism according to the invention provides that the bearing shaft have an external thread on the second end and that the adjusting element be in the form of an adjusting nut having an internal thread corresponding to the external thread. In this way, the adjusting element and its operative connection with a remainder of the overload protection device are implemented in a particularly simple manner in terms of design and production.

An advantageous embodiment of the inventive operating mechanism provides that the toothed disk and the drive fork be disposed between the spring and the adjusting element, preferably, that the spring be in the form of at least one disk spring. This enables a particularly compact and functionally reliable arrangement of the toothed disk and the drive fork of the operating mechanism according to the invention. The preferred variant of this embodiment has the further advantage that, thanks to the at least one disk spring, the spring can be configured in a very compact but also flexible manner, for example, by means of a suitable series connection and/or parallel connection of individual disk springs in the case of a plurality of disk springs.

Another advantageous embodiment of the operating mechanism according to the invention provides that the overload protection device be configured to compensate both for the sliding support being incorrectly operated toward its retracted position and for the sliding support being incorrectly operated toward its extended position. In this way, the protection of the operating mechanism against overloading is further enhanced.

Furthermore, an advantageous embodiment of the operating mechanism according to the invention provides that the overload protection device be mounted to the housing of the cooking appliance via the operating mechanism in such a way that the adjusting element is directly accessible from the outside. In this way, access to the adjusting element for adjusting the contact force between the first and second contact surfaces of the overload protection device is further simplified. For example, this eliminates the need to first remove a cover or the like that covers the adjustment element.

An advantageous embodiment of the inventive cooking appliance provides that the operating mechanism have a drive unit for generating a torque, the drive unit being disposed outside of the cooking chamber and mechanically coupled to a hinge of the cooking chamber door, a drive shaft torque-transmittingly connected to the drive unit and substantially sealingly extending through one of the cooking chamber walls, and a drive rod torque-transmittingly connected to the drive shaft and force-transmittingly connected to the sliding support, the overload protection device being configured as an integral part of the drive unit. Because the drive unit is disposed outside of the cooking chamber, the operating mechanism, except for the drive shaft and the drive rod, is disposed outside of the cooking chamber, so that only a very small portion of the space available in the cooking chamber is occupied by the operating mechanism. Accordingly, the essential part of the cooking chamber volume is available for the cooking process. In cases where side racks or the like are arranged in the cooking chamber, a space conflict between the side racks or the like and the operating mechanism is substantially avoided in accordance with the invention. Thus, when it comes to the interior design and features of the cooking chamber, it is possible to use existing accessories, such as existing side racks or the like. It is therefore not necessary to adapt the aforementioned accessories to the interior design and features of the inventive cooking appliance having the operating mechanism.

In FIGS. 1 through 4, an exemplary embodiment of the inventive cooking appliance having the inventive operating mechanism is illustrated in purely schematic form.

Cooking appliance 2 is in the form of a household baking oven and includes a housing 4, a cooking chamber 16 disposed in housing 4 and bounded by cooking chamber walls 6, 8, 10, 12, 14, a cooking chamber door 18 movable back and forth between a closed position and an open position for closing a cooking chamber opening 20 of cooking chamber 16 in the closed position of cooking chamber door 18 and for access to cooking chamber 16 via cooking chamber opening 20 in the open position of cooking chamber door 18, and a sliding support 22 mounted on two opposite cooking chamber side walls 10, 12 of the cooking chamber walls 6 through 14 and adapted for supporting a separate accessory in the form of a baking sheet of cooking appliance 2 for receiving food to be cooked, the sliding support 22 being movable back and forth between a retracted position, in which sliding support 22 is fully received in cooking chamber 16, and an extended position, in which sliding support 22 is at least partially extended out of cooking chamber 16. Sliding support 22 is not shown in FIG. 1.

Furthermore, cooking appliance 2 has an operating mechanism 24 for automatically operating sliding support 22, the operating mechanism 24 having a drive unit 26 for generating a torque, the drive unit 26 being disposed outside of cooking chamber 16, a drive shaft 28 torque-transmittingly connected to drive unit 26 and substantially sealingly extending through the cooking chamber bottom wall 6 of the cooking chamber walls 6 through 14, and a drive rod 30 torque-transmittingly connected to drive shaft 28 and force-transmittingly connected to sliding support 22.

In the present exemplary embodiment, drive unit 26 is thus disposed below cooking chamber bottom 6, with drive shaft 28 extending through cooking chamber bottom 6.

Further, drive unit 26 is here configured as a transmission mechanically coupled to cooking chamber door 18, namely to a hinge 32 of cooking chamber door 18.

Drive unit 26, which is configured as a transmission, has a pair of gears, one gear 34 of the gear pair being mechanically coupled to cooking chamber door 18, namely to hinge 32, and the other gear 36 of the gear pair being mechanically coupled to drive shaft 28. Here, each of the two gears 34, 36 has a spur toothing, the gear 34 being configured only as a gear segment; i.e., as a toothed disk.

Cooking chamber door 18, namely hinge 32, further has a coupling pin 38, and the drive unit 26 mechanically coupled to cooking chamber door 18, namely to hinge 40, has a drive fork 40 formed correspondingly to coupling pin 38, the coupling pin 38 and the drive fork 40 being configured and arranged to match each other in such a way that coupling pin 38 is movable at least partially independently of drive fork 40 during movement of cooking chamber door 18 from its closed position to its open position and/or from its open position in its closed position. This will be explained in greater detail below.

In the present exemplary embodiment, sliding support 22 is mounted on the two opposite cooking chamber side walls 10, 12 of the cooking chamber walls 6 through 14, sliding support 22 having a left sliding rail 42 disposed at one cooking chamber side wall 10 and a right sliding rail 44 disposed at the other cooking chamber side wall 12, the sliding rails 42, 44 being adapted for supporting the separate accessory and permanently connected to each other by a connecting bar 46. Connecting bar 46 is mounted on the two sliding rails 42, 44 at an end of sliding support 22 facing away from cooking chamber opening 20, when considered in relation to the retracted position of sliding support 22, the drive rod 30 being force-transmittingly connected to connecting bar 46. For this purpose, drive rod 30 engages force-transmittingly by means of a sliding block in a guide slot of connecting bar 46.

Figure 2:
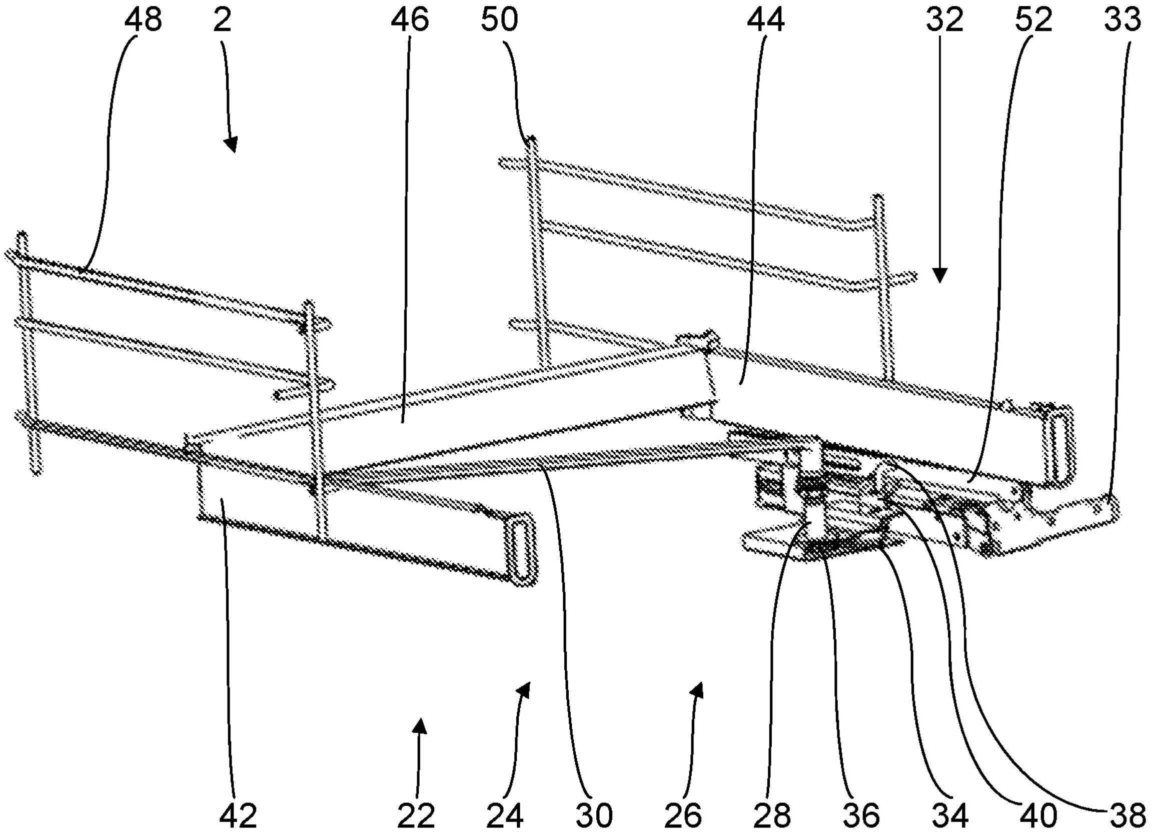
FIG. 2 is a perspective detail view of a portion of the exemplary embodiment in the region of the sliding support, showing the sliding support during movement to its extended position, with the cooking chamber door in the 75-degree position.
Figure 3:
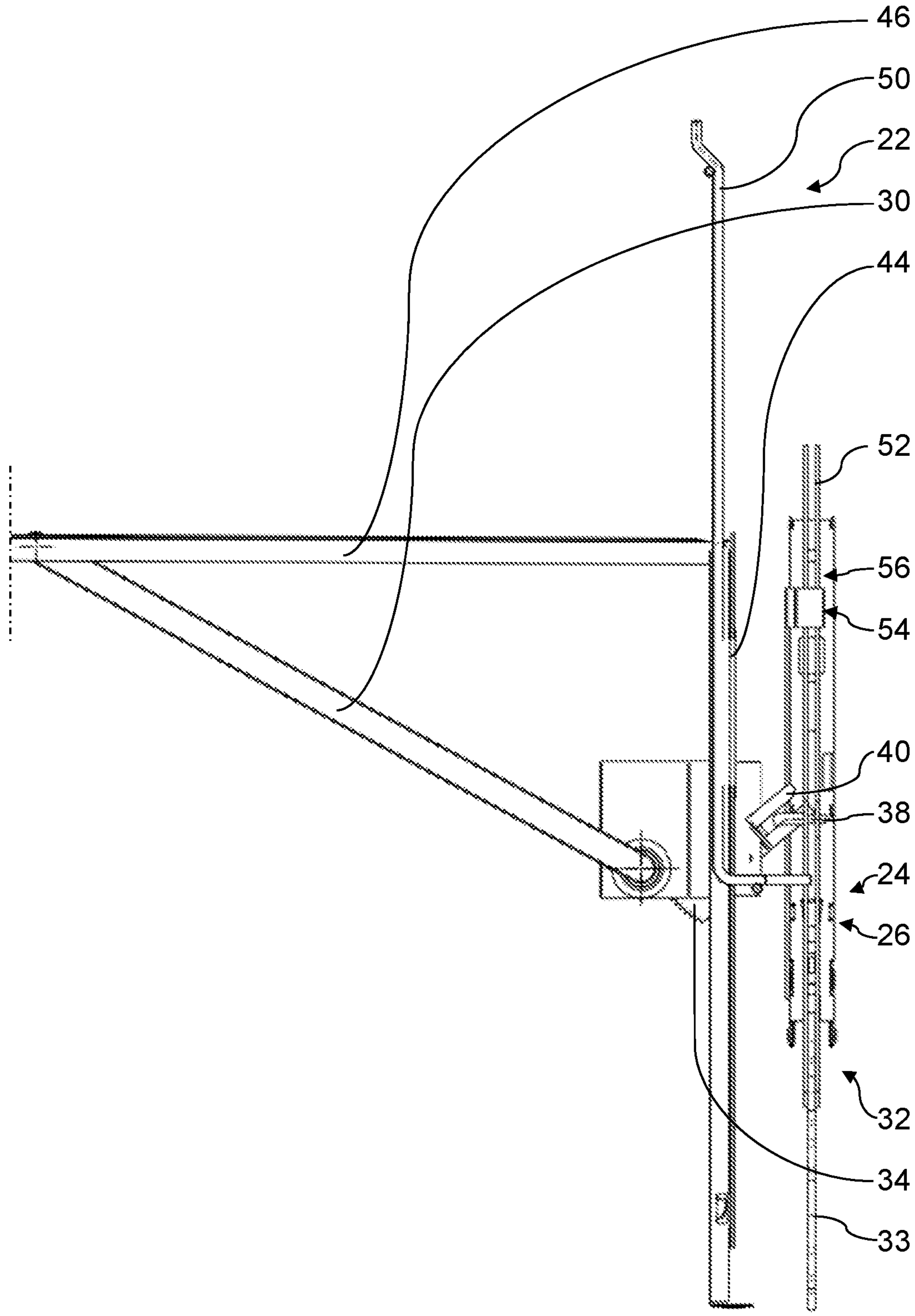
FIG. 3 is a partial plan view of the exemplary embodiment of FIG. 2.
Figure 4:
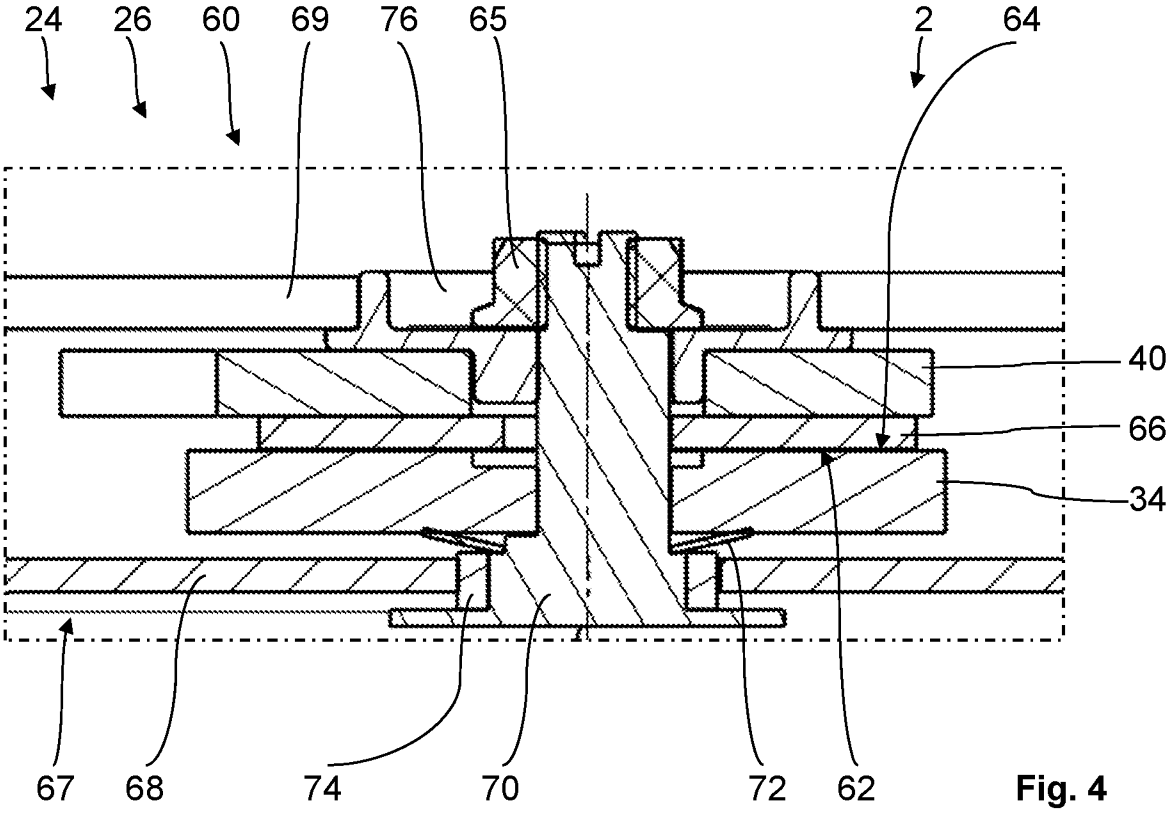
FIG. 4 is an enlarged, 180-degree rotated partial sectional side view showing a portion of the exemplary embodiment in the region of the overload protection device.

As can also be seen from FIGS. 2 and 3, sliding support 22 is removably supported by the two sliding rails 42, 44 on respective side racks 48, 50, each mounted on an associated cooking chamber side wall 10, 12. Side racks 48, 50 may be configured such that at least one further separate accessory of cooking appliance 2, such as another baking sheet or rack, for receiving another food to be cooked can be supported on the two side racks 48, 50 in addition to sliding support 22.

In accordance with the invention, operating mechanism 24 has an overload protection device 60 to protect operating mechanism 24 from being damaged by improper use of cooking chamber door 18 and/or of sliding support 22, the overload protection device 60 being designed as a slip coupling having a first contact surface 62 as well as a second contact surface 64 which, in non-overload conditions, is force-transmittingly connected to first contact surface 62, and the two aforementioned contact surfaces 62, 64 each being configured as a friction surface, and the overload protection device 60 being configured such that a contact force between first contact surface 62 and second contact surface 64 can be manually adjusted using an adjusting element 65 of overload protection device 60 without any need to remove operating mechanism 24 from a remainder of cooking appliance 2. Here, overload protection device 60 is configured as an integral part of drive unit 26.

As will be explained in more detail below, overload protection device 60 is here designed such that the aforementioned adjustment can be done simply by manipulating the single adjusting element 65 of overload protection device 60.

In the present exemplary embodiment, overload protection device 60 is essentially disposed in an overload protector housing 67 and mounted on overload protector housing 67, the overload protector housing 67 being releasably or permanently attachable to housing 4 of cooking appliance 2.

In the present exemplary embodiment, drive fork 40 has the first contact surface 62, and toothed disk 34 has the second contact surface 64, the toothed disk 34 and the drive fork 40 being torque-transmittingly mounted on a common bearing shaft 70 of operating mechanism 24 and capable of being biased against each other by means of a spring 72 of overload protection device 60 and adjusting element 65, a friction liner 66 having the first contact surface 62 being non-rotatably disposed on drive fork 40. Toothed disk 34 and drive fork 40 are disposed between adjusting element 65 and spring 72, which is in the form of a disk spring.

Bearing shaft 70 is supported with a first end of bearing shaft 70 and a first bearing element 74 of operating mechanism 24 at a side 68 of overload protector housing 67 facing the cooking chamber 16 of cooking appliance 2 and with a second end of bearing shaft 70 and a second bearing element 76 of operating mechanism 24 at a side 69 of overload protector housing 67 opposite the aforementioned side 68, the first and second bearing elements 74, 76 each being configured to reduce friction as compared to if bearing shaft 70 were supported directly on overload protector housing 67. Further, second bearing element 76 interlockingly connects drive fork 40 to bearing shaft 70, the bearing shaft 70 having a contour that interlockingly engages with second bearing element 76 and with toothed disk 34. This contour is crescent-shaped.

Furthermore, bearing shaft 70 has an external thread on its second end, and adjusting element 65 is in the form of an adjusting nut having an internal thread corresponding to the external thread. Stops on overload protector housing 67 ensure that adjustment of the contact force can be done simply by manipulating the single adjusting element 65. This is because the aforementioned stops effectively prevent rotation of bearing shaft 70 during adjustment of the contact force. In addition, co-rotation of second bearing element 76 with bearing shaft 70 prevents accidental detachment of adjusting element 65, which is in the form of an adjusting nut, from bearing shaft 70. Since the second end of bearing shaft 70 protrudes downwardly from overload protector housing 67, adjusting element 65 can be manipulated without any need to remove operating mechanism 24 from housing 4 of cooking appliance 2.

In addition, in the present exemplary embodiment, overload protection device 60 is mounted to housing 4 of cooking appliance 2 via operating mechanism 24 in such a way that adjusting element 65 is directly accessible from the outside.

In the following, the operation of the inventive cooking appliance having the inventive operating mechanism according to the present exemplary embodiment will be described in more detail with reference to FIGS. 1 through 4.

Initially, cooking appliance 2 is in a non-operating condition, and cooking chamber door 18 is in its closed position. Sliding support 22 is in its retracted position.

The user then wants to place the food to be cooked (e.g., a piece of meat) on the separate accessory, which is in the form of a baking sheet and is supported on sliding support 22. The user, the food to be cooked, and the separate accessory are not shown in FIGS. 1 through 4.

To this end, the user grabs cooking chamber door 18 and manually moves it from its closed position to its open position. In this process, the position of cooking chamber door 18 gradually changes from its closed position; i.e. from 0 degree, to its open position, namely 90 degrees. This movement is not specifically illustrated, but FIGS. 2 and 3 correspond to a 75-degree position and FIG. 1 to the 90-degree position of cooking chamber door 18. Of cooking chamber door 18, only the hinge 32 with a hinge blade 33 of cooking chamber door 18 is shown in FIGS. 2 and 3.

During the aforementioned manual movement of cooking chamber door 18 from its closed position to its open position, sliding support 22 is automatically moved from its retracted position to its extended position because of the mechanical coupling via operating mechanism 24. When cooking chamber door 18 is moved from its closed position to its open position, an operating rod 52 of hinge 32, which is articulated at one end to hinge blade 33, is automatically moved conjointly therewith. Coupling pin 38 is mounted on operating rod 52, so that coupling pin 38 is also automatically moved conjointly therewith. At another end opposite the aforementioned end, operating rod 52 is longitudinally movably and articulatedly attached to a remainder of hinge 32. For this purpose, the aforementioned remainder of hinge 32 has a retaining pin 54, and operating rod 52 has a corresponding linear guide 56.

During movement of cooking chamber door 18 from its 0-degree position (i.e., its closed position) to approximately its 55-degree position, sliding support 22 remains in its retracted position. Coupling pin 38 is thus initially moved independently of drive fork 40.

After cooking chamber door 18 has passed through approximately its 55-degree position, coupling pin 38 engages in drive fork 40, so that during the further movement of cooking chamber door 18 from its closed position to its open position, coupling pin 38 automatically causes co-movement of toothed disk 34 via drive fork 40. As a result of this rotation of toothed disk 34, gear 36, drive shaft 28, and the drive rod 30 torque-transmittingly connected to drive shaft 28 are automatically rotated as well. Since drive rod 30 force-transmittingly engages by means of the sliding block in the guide slot of connecting bar 46, the aforementioned rotational movement of drive shaft 28 is converted, via drive rod 30 and the aforementioned sliding block and guide slot combination, into in a linear movement of sliding support 22 parallel to the two side racks 48, 50, so that sliding support 22 is automatically moved from its retracted position to its extended position. In this regard, see FIGS. 2 and 3.

In accordance with FIG. 1, cooking chamber door 18 is in its open position; i.e. in its 90-degree position. Sliding support 22 is in its retracted position. As desired, the user can place the food to be cooked on the separate accessory, namely the baking sheet, supported on sliding support 22.

After this has been done, the user wants to move sliding support 22 back to its retracted position and to close cooking chamber door 18 in order to perform a cooking process. To this end, the user grabs cooking chamber door 18 and manually moves it from its open position to its closed position. In this process, cooking chamber door 18 performs the above-described movement again, but in the opposite direction. Operating mechanism 24 is configured such that when cooking chamber door 18 is moved from its 90-degree position (i.e., its open position) toward its closed position, sliding support 22 is immediately and automatically moved conjointly therewith in the above-described manner, without the sliding support 22 colliding with cooking chamber door 18 in the process. Thus, no provision is made for coupling pin 38 to initially move independently as cooking chamber door 18 is moved from its open position to its closed position and, thus, as sliding support 22 is moved from its extended position to its retracted position. Therefore, coupling pin 38 causes drive fork 40 to immediately move conjointly with it. During the aforementioned movement of cooking chamber door 18 from its open position to its closed position, coupling pin 38 automatically causes co-movement of toothed disk 34 via drive fork 40, so that gear 36 and, thus, drive shaft 28, as well as drive rod 30 are rotated as well. Since drive rod 30 force-transmittingly engages by means of the sliding block in the guide slot of connecting bar 46, the aforementioned rotational movement of drive shaft 28 is converted, via drive rod 30 and the aforementioned sliding block and guide slot combination, into in a linear movement of sliding support 22 parallel to the two side racks 48, 50 again, so that sliding support 22 is automatically moved from its extended position to its retracted position.

In accordance with the invention, to protect operating mechanism 24 from being damaged by overloading, operating mechanism 24 additionally has the overload protection device 60 in the form of a slip coupling.

Friction liner 66, which is in the form of a rubber liner and is mounted on drive fork 40, is biased by spring 72 against toothed disk 34. In accordance with the invention, a spring force of spring 72 is settable and adjustable so that a normal force; i.e. the contact force with which the two contact surfaces 62, 64 are pressed against each other, can be set or adjusted in advance or during maintenance of cooking appliance 2 in the manner described above. When cooking chamber door 18 is moved to its closed position or to its open position, drive fork 40 on one side and toothed disk 34 on the other side are thereby resynchronized, namely, properly aligned with each other by means of the two contact surfaces 62, 64. Thus, overload protection device 60 is configured such that the above-mentioned synchronization takes place automatically each time the cooking chamber door 18 is moved to its closed position and to its open position. In the present exemplary embodiment, overload protection device 60 is thus, at the same time, designed a synchronizer for automatically aligning drive fork 40 and toothed disk 34 to bring these two parts of the drive unit 26 of operating mechanism 24 into a proper position relative to each other. The above-mentioned design of slip coupling 60 allows it to compensate for overloading in both directions of rotation of toothed disk 34. Accordingly, overload protection device 60 is configured such that overload protection device 60 compensates both for the sliding support 22 being incorrectly operated toward its retracted position and for the sliding support 22 being incorrectly operated toward its extended position.

Alternatively or in addition to the two contact surfaces 62, 64, that is, to a purely frictional engagement, it is also conceivable that in other embodiments, the slip coupling may create a purely frictional engagement or a combination of interlocking engagement and frictional engagement in non-overload conditions. Thus, in other embodiments of the inventive cooking appliance, the two contact surfaces of the slip coupling may each be configured as a purely interlocking engagement surface or as a friction surface and, at the same time, an interlocking engagement surface. Instead of rubber liner 66, other liners, such as material combinations, are also conceivable. It is, of course, also possible to conceive of slip couplings where no liner is used at all, but where the two contact surfaces are, for example, formed directly on the drive fork and on the toothed disk. The slip coupling may alternatively also be disposed elsewhere in the operating mechanism. For example, it would be conceivable for the drive shaft to be divided into two parts for this purpose, with the slip coupling then being formed at the point of force transfer from one part of the drive shaft to the other part of the drive shaft. Furthermore, in yet other embodiments, the connection point between the drive shaft and the drive rod could be configured as the slip coupling.

Due to the inventive design of cooking appliance 2 with the operating mechanism 24, operating mechanism 24 is effectively protected from being damaged in the event of improper use of cooking chamber door 18 and/or of sliding support 22. In addition, the individual components of the inventive cooking appliance 2 that are relevant for the automatic movement of sliding support 22 can be designed and manufactured with less material. This also allows the aforementioned components to be manufactured with greater tolerances and thus more cost-effectively. Thus, the above-mentioned adjustment of overload protection device 60 simplifies assembly during the manufacture of the cooking appliance 2 equipped with operating mechanism 24. This is because the capability of adjustment makes it easy to compensate for component and assembly tolerances, for example. In addition, overload protection device 60 of operating mechanism 24 allows the overload protection device 60 to be adjusted on site and, thus, after installation and initial operation at the end user's location. Such adjustment may be necessary, for example, when, due to wear and tear of the material, the contact force acting between the first and second contact surfaces 62, 64 falls below a lower limit for the proper functioning of overload protection device 60. The term "drive rod" is intended herein to have a wide meaning and to include also rail-like or plate-like variants, for example.

The design of operating mechanism 24, namely, of drive unit 26 with the integrated overload protection device 60, allows the coefficient of friction acting between the two contact surfaces 62, 64 to be set in a defined manner since friction liner 66 only rubs with first contact surface 62 along second contact surface 64. The stops on overload protector housing 67 ensure that adjustment of the contact force can be done simply by manipulating the single adjusting element 65. This is because the aforementioned stops effectively prevent rotation of bearing shaft 70 during adjustment of the contact force. In addition, the co-rotation of second bearing element 76 with bearing shaft 70 prevents accidental detachment of adjusting element 65, which is in the form of an adjusting nut, from bearing shaft 70. Moreover, since the second end of bearing shaft 70 protrudes downwardly from overload protector housing 67, adjusting element 65 can be manipulated without any need to remove operating mechanism 24 from housing 4 of cooking appliance 2.

The invention is not limited to the present exemplary embodiment. In this regard, see, for example, the relevant explanations in the introductory part of the description and the alternatives mentioned in the text of the description.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An operating mechanism for a sliding support of a cooking appliance having a cooking chamber which is closable by a cooking chamber door, the operating mechanism being configured to automatically operate the sliding support, the operating mechanism comprising:

an overload protection device configured to protect the operating mechanism from being damaged by improper use of the cooking chamber door and/or of the sliding support, the overload protection device comprising a slip coupling having a first contact surface and a second contact surface which, in non-overload conditions, is force-transmittingly connected to the first contact surface, each contact surface comprising at least one of a friction surface and/or an interlocking engagement surface, wherein the overload protection device is configured such that a contact force between the first contact surface and the second contact surface is manually adjustable using an adjusting element of the overload protection device without any need to remove the operating mechanism from a remainder of the cooking appliance, and wherein the overload protection device is configured so as to compensate both for the sliding support being incorrectly operated toward a retracted position thereof and for the sliding support being incorrectly operated toward an extended position thereof.

2. The operating mechanism of claim 1, wherein the overload protection device is configured such that manual adjustment of the contact force comprises only manipulating the adjusting element.

3. The operating mechanism of claim 1, wherein the overload protection device is disposed in an overload protector housing and mounted on the overload protector housing, the overload protector housing being releasably or permanently attachable to a housing of the cooking appliance.

4. The operating mechanism of claim 3, further comprising:

a drive fork force-transmittingly couplable to a hinge of the cooking chamber door and comprising the first contact surface and a toothed disk directly or indirectly force-transmittingly coupled to the sliding support and comprising the second contact surface, the toothed disk and the drive fork being torque-transmittingly mounted on a common bearing shaft of the operating mechanism and biased against each other by a spring of the overload protection device and the adjusting element.

5. The operating mechanism of claim 4, wherein the bearing shaft is supported with a first end of the bearing shaft and a first bearing element of the operating mechanism at a first side of the overload protector housing facing the cooking chamber of the cooking appliance and with a second end of the bearing shaft and a second bearing element of the operating mechanism at a second side of the overload protector housing opposite the first side, and wherein the first and second bearing elements are each configured to reduce friction as compared to if the bearing shaft were supported directly on the overload protector housing.

6. The operating mechanism of claim 5, wherein the bearing shaft has an external thread on the second end of the bearing shaft, and wherein the adjusting element comprises an adjusting nut having an internal thread corresponding to the external thread.

7. The operating mechanism of claim 4, wherein the toothed disk and the drive fork are disposed between the spring and the adjusting element.

8. The operating mechanism of claim 1, wherein the overload protection device is mounted to the housing of the cooking appliance via the operating mechanism such that the adjusting element is directly accessible from outside.

9. A cooking appliance, comprising:

a housing;

a cooking chamber disposed in the housing and bounded by cooking chamber walls;

a cooking chamber door movable back and forth between a closed position and an open position for closing a cooking chamber opening of the cooking chamber in the closed position of the cooking chamber door and for access to the cooking chamber via the cooking chamber opening in the open position of the cooking chamber door;

a sliding support mounted on at least one cooking chamber wall of the cooking chamber walls and configured to support a separate accessory of the cooking appliance configured to receive food to be cooked, and an operating mechanism for the sliding support, the operating mechanism being configured to automatically operate the sliding support, the operating mechanism comprising an overload protection device configured to protect the operating mechanism from being damaged by improper use of the cooking chamber door and/or of the sliding support, the overload protection device comprising a slip coupling having a first contact surface and a second contact surface which, in non-overload conditions, is force-transmittingly connected to the first contact surface, each contact surface comprising at least one of a friction surface and/or an interlocking engagement surface, the overload protection device being configured such that a contact force between the first contact surface and the second contact surface is manually adjustable using an adjusting element of the overload protection device without any need to remove the operating mechanism from a remainder of the cooking appliance, wherein the sliding support is automatically movable back and forth, by the operating mechanism between a retracted position, in which the sliding support is fully received in the cooking chamber, and an extended position, in which the sliding support is at least partially extended out of the cooking chamber, and wherein the overload protection device is configured so as to compensate both for the sliding support being incorrectly operated toward a retracted position thereof and for the sliding support being incorrectly operated toward an extended position thereof.

10. The cooking appliance of claim 9, wherein the operating mechanism has a drive unit configured to generate a torque, the drive unit being disposed outside the cooking chamber and mechanically coupled to a hinge of the cooking chamber door, a drive shaft torque-transmittingly connected to the drive unit and substantially sealingly extending through one of the cooking chamber walls, and a drive rod torque-transmittingly connected to the drive shaft and force-transmittingly connected to the sliding support, the overload protection device comprising an integral part of the drive unit.

11. The operating mechanism of claim 4, wherein a friction and/or interlock liner having the first contact surface or the second contact surface is non-rotatably disposed on the drive fork or on the toothed disk.

12. The operating mechanism of claim 5, wherein the second bearing element is configured to interlockingly connect the drive fork to the bearing shaft.

13. The operating mechanism of claim 12, wherein the bearing shaft has a contour configured to interlockingly engage with the second bearing element and the toothed disk.

14. The operating mechanism of claim 7, wherein the spring comprises at least one disk spring.

15. An operating mechanism for a sliding support of a cooking appliance having a cooking chamber which is closable by a cooking chamber door, the operating mechanism being configured to automatically operate the sliding support, the operating mechanism comprising:

an overload protection device configured to protect the operating mechanism from being damaged by improper use of the cooking chamber door and/or of the sliding support, the overload protection device comprising a slip coupling having a first contact surface and a second contact surface which, in non-overload conditions, is force-transmittingly connected to the first contact surface, each contact surface comprising at least one of a friction surface and/or an interlocking engagement surface, wherein the overload protection device is configured such that a contact force between the first contact surface and the second contact surface is manually adjustable using an adjusting element of the overload protection device without any need to remove the operating mechanism from a remainder of the cooking appliance, and wherein the overload protection device is configured such that manual adjustment of the contact force comprises only manipulating the adjusting element.

* * * * *